R. W. SELLEW.
METHOD OF FORMING BALL BEARINGS.
APPLICATION FILED MAR. 14, 1921.
1,435,507.
Patented Nov. 14, 1922.
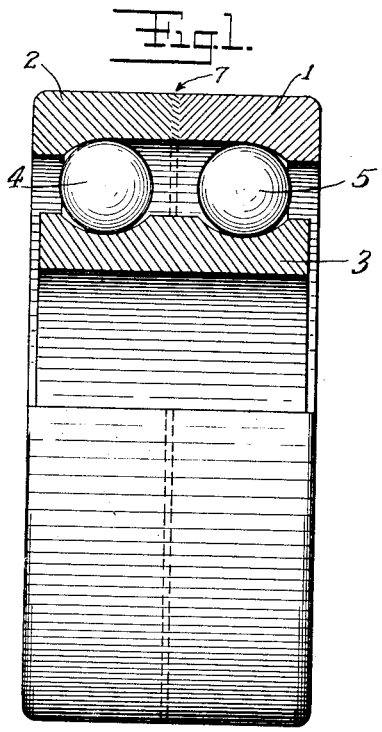
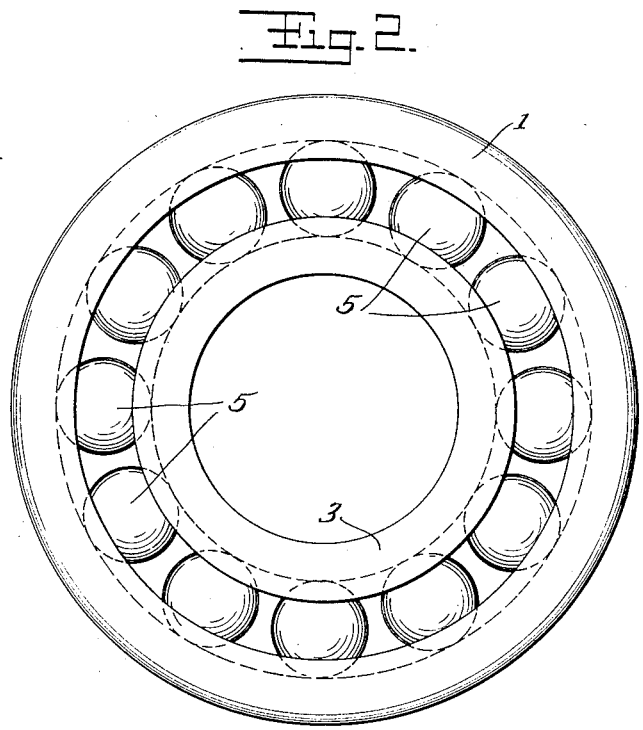
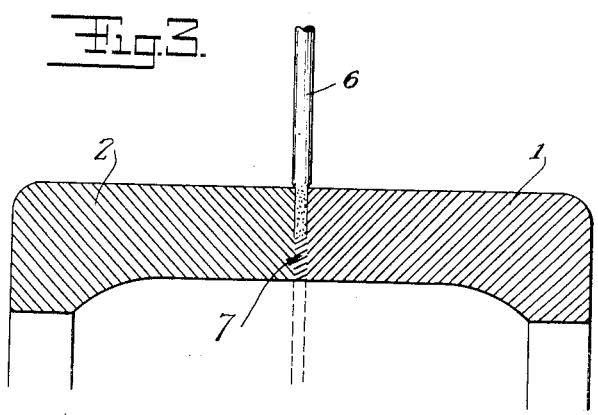
Inventor
R. W. Sellew
By his Attorneys Patented Nov. 14, 1922.

1,435,507

UNITED STATES PATENT OFFICE.

ROLAND WINCHESTER SELLEW, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

METHOD OF FORMING BALL BEARINGS.

Original application filed October 19, 1920, Serial No. 417,948. Divided and this application filed March 14, 1921. Serial No. 452,062.

*To all whom it may concern:*

Be it known that I, ROLAND W. SELLEW, a citizen of the United States of America, residing at New Britain, Hartford County, Connecticut, have invented a new and useful Method of Forming Ball Bearings, of which the following is a specification.

My invention relates to a method of forming a ball bearing of the general type disclosed in my copending application #417,948 filed October 19, 1920, of which application this one is a division. The invention is particularly adapted to double row ball bearings, but is of course not limited thereto.

The preferred method of making the bearing is as follows: Inner and outer bearing rings are provided with complementary raceways therein and one of the rings is made in two parts or sections. After the balls are assembled between the bearing rings, the two parts of the two section ring are brought together to hold the balls between them with the desired degree of pressure and to bring the adjacent edges of the sections into proximity to each other. A fusible electrode is then applied near the adjacent edges of the sections and a current passed through the electrode and one or both of the sections whereby the electrode will be fused and the fused metal will form a weld to connect the two sections together. The sections and electrode may be rotated relatively to each other to weld the sections together entirely around their peripheries.

In the drawings, which show a preferred form of my invention:—

Fig. 1 is an edge elevation of a bearing, parts being shown in section.

Fig. 2 is a side elevation thereof.

Fig. 3 is an enlarged fragmentary partially diagrammatic view showing sections of a ring as they would appear when being welded together.

One of the rings, preferably the outer, is made in two ring like sections 1—2. 3 indicates the inner ring. 4—5 indicate the balls of two separate series which run in complementary race-ways in the inner and outer rings.

In assembling the bearing the edges of the sectional ring are separated and the balls assembled between the rings. The sections are next brought toward each other until the desired pressure between the balls and rings is attained and the adjacent edges of the sections will be in proximity to each other. In the drawings, the distance between the edges of the sections is slightly exaggerated for the sake of clearness, but it should be understood that if desired, the sections may meet, or be very close together.

When the sections have been forced toward each other with the desired pressure, a fusible electrode 6 is applied near the adjacent edges of the sections and a current passed through the electrode and the sections. Upon the passage of the current the fusible electrode will be fused and the fused metal will weld the sections together as indicated at 7. If it is desired to weld the sections together about their entire peripheries, the sections and the electrode will be rotated relatively to each other.

I wish it to be understood that various changes and modifications may be made within the scope of the appended claims.

What I claim is:

1. The method of forming a bearing ring which comprises holding two sections of a ring in proximity to each other, holding a fusible electrode in proximity to the adjacent edges of said sections and passing a current through said fusible electrode and said sections whereby the fusible electrode will be fused and will weld the sections together.

2. The method of forming a bearing ring which comprises holding two sections of a ring in proximity to each other, holding a fusible electrode in proximity to the adjacent edges of said sections, passing a current through said fusible electrode and said sections for fusing the electrode and welding the sections together and rotating said fusible electrode and sections relatively to each other whereby the sections will be welded about their peripheries.

3. The method of forming a bearing ring which comprises holding two sections of a ring in proximity to each other, applying a fusible electrode to the adjacent edges of said sections, passing a current through said electrode and sections whereby the electrode will be fused and the sections welded together.

4. The method of forming a ball bearing which comprises assembling two rows of balls on a ring provided with raceways thereon, then assembling with said ring and balls a second ring having complementary raceways therein one of said rings being formed in sections, then applying a fusible electrode adjacent the edges of said sections and passing a current through said fusible electrode and said sections for welding the sections together to form a unitary bearing.

5. The method of forming a ball bearing which comprises assembling a row of balls on a bearing ring having a raceway therein, then assembling a ring having a complementary raceway therein with said first mentioned ring and balls, one of said rings being formed in sections with adjacent edges in close proximity to each other when assembled, then holding a fusible electrode in proximity to the adjacent edges of the ring sections and passing a current between said fusible electrode and said sections for fusing the electrode and causing the ring sections to be welded together for forming a unitary bearing.

ROLAND WINCHESTER SELLEW.